United States Patent
Cooper et al.

(10) Patent No.: US 8,709,522 B2
(45) Date of Patent: Apr. 29, 2014

(54) FABRICATED LEAF TEA PRODUCTS

(75) Inventors: Michael Alan Cooper, Sharnbrook (GB); Ian Smith, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 13/812,576

(22) PCT Filed: Jul. 15, 2011

(86) PCT No.: PCT/EP2011/062136
§ 371 (c)(1),
(2), (4) Date: Jan. 28, 2013

(87) PCT Pub. No.: WO2012/013519
PCT Pub. Date: Feb. 2, 2012

(65) Prior Publication Data
US 2013/0129873 A1    May 23, 2013

(30) Foreign Application Priority Data
Jul. 30, 2010 (EP) ...................................... 10171398

(51) Int. Cl.
*A23F 3/22* (2006.01)
(52) U.S. Cl.
USPC .......................................... 426/597; 426/471
(58) Field of Classification Search
USPC ................................................. 426/471, 597
See application file for complete search history.

(56) References Cited

U.S. PATENT DOCUMENTS

| | | | |
|---|---|---|---|
| 3,633,283 A * | 1/1972 | Mishkin et al. .................... 34/73 |
| 4,004,038 A * | 1/1977 | Wickremasinghe .......... 426/422 |
| 4,472,441 A * | 9/1984 | Clark et al. .................... 426/387 |
| 4,639,375 A * | 1/1987 | Tsai ................................ 426/49 |
| 5,554,400 A * | 9/1996 | Stipp ............................... 426/78 |
| 5,968,580 A * | 10/1999 | Chuang et al. ................. 426/548 |
| 6,254,902 B1 * | 7/2001 | Hodges et al. .................. 426/49 |
| 6,291,006 B1 * | 9/2001 | Butterbaugh et al. ........ 426/594 |
| 7,109,236 B2 * | 9/2006 | Zaveri et al. .................. 514/456 |
| 7,815,960 B2 | 10/2010 | Quan et al. |
| 8,327,754 B2 * | 12/2012 | Kirschner et al. ............... 99/295 |
| 2006/0188609 A1 * | 8/2006 | Jordan et al. ..................... 426/77 |
| 2008/0138489 A1 * | 6/2008 | Nagao et al. ................... 426/592 |
| 2009/0169679 A1 | 7/2009 | Deka et al. |
| 2009/0196975 A1 * | 8/2009 | Inoue et al. .................... 426/593 |

FOREIGN PATENT DOCUMENTS

| | | |
|---|---|---|
| CN | 1082327 | 2/1994 |
| CN | 101123881 A | 2/2008 |
| EP | 0910956 A1 | 4/1999 |
| EP | 1774878 A1 | 4/2007 |
| EP | 2198721 A1 | 6/2010 |
| GB | 860745 | 2/1961 |
| GB | 2322282 | 8/1998 |
| JP | 59042846 | 9/1982 |
| JP | 2003225053 | 8/2003 |
| JP | 2006296322 | 11/2006 |
| WO | WO90/15542 | * 12/1990 |
| WO | WO02069727 | 9/2002 |
| WO | WO2004002235 | 1/2004 |
| WO | WO2006012238 A2 | 2/2006 |
| WO | WO2007039018 | 4/2007 |
| WO | WO2007042415 A1 | 4/2007 |
| WO | WO2009098231 A1 | 8/2009 |

OTHER PUBLICATIONS

Joubert. International Journal of Food Science and Technology. 1988. vol. 23. pp. 203-207.*
International Search Report, PCT/EP2011/062136, mailed Aug. 16, 2011, 4 pp.
European Search Report, EP 10 17 1398, dated Jan. 5, 2011, 2 pp.

* cited by examiner

*Primary Examiner* — Anthony Weier
(74) *Attorney, Agent, or Firm* — Ellen Plotkin

(57) ABSTRACT

Shown is a process for manufacturing a fabricated leaf tea product. The process includes the steps of: (i) providing a concentrated liquid tea composition; (ii) providing a base leaf tea; (iii) combining the concentrated liquid tea composition with the base leaf tea to form a tea mixture having a total soluble solids content of at least 50% by dry weight of the mixture; and (iv) drying the tea mixture. At least 20% by weight of the base leaf tea has a particle size of +16 mesh and/or the tea mixture is sorted according to particle size to yield a fraction wherein at least 20% by weight of the fraction has a particle size of +16 mesh; and the time between forming the tea mixture (step iii) and drying (step iv) is at least 5 minutes.

9 Claims, No Drawings

FABRICATED LEAF TEA PRODUCTS

TECHNICAL FIELD OF THE INVENTION

The present invention relates to a process for manufacturing a fabricated leaf tea product. In particular the present invention relates to fabricating leaf tea products having a large leaf size.

BACKGROUND TO THE INVENTION

Tea is generally prepared as green leaf tea or black leaf tea. The method of preparing such teas is well known to those skilled in the art. Generally, to prepare black leaf tea, fresh green leaves of the plant *Camellia sinensis* are withered (subjected to mild drying), comminuted, fermented (in which process enzymes in the leaf tea use atmospheric oxygen to oxidise various substrates to produce brown-coloured products) and then fired (to dry the tea leaves). Green leaf tea is not exposed to the fermentation process. Partial fermentation may be used to produce intermediate-type teas known as "oolong" tea.

Leaf teas, of whatever type, are normally constrained in terms of their properties by the location of their production, which usually limits the choice of tea varieties, agronomy and the manufacturing process used.

Leaf size is often seen as an indicator of quality with larger leaf teas being viewed by many consumers as being highest in quality. Unfortunately, however, traditional large-leaf tea is slow to infuse. Thus manufacturing technologies have been developed which are capable of producing large-leaf tea that has enhanced infusion performance, one example of which is the technology described in WO 02/069727 (UNILEVER).

Today tea based beverages can be prepared by methods other than infusing leaves in hot water and served in ways other than poured from tea pots. For example they can be made with concentrates or powders that are mixed with hot water in vending machines or used to prepare ready to drink teas in cans and bottles. A more recent development has seen the introduction of capsule-based systems wherein the tea is brewed within a disposable capsule by a specially designed brewing machine. Such a capsule-based system is described, for example, in WO 2007/042415 (NESTEC SA).

Meeting the consumer's demand for convenience (especially short brew times) from vending and capsule-based systems can be challenging and so technologies have been developed to fabricate leaf tea products by combining a base leaf tea with instant tea solids. For example WO 2004/002235 (UNILEVER) discloses a method for preparing a fabricated leaf tea product comprising mixing leaf tea with tea solids derived from tea powders, the method being characterised in that the mixture of tea leaves and tea powder is simultaneously wetted with water and dried.

The method of WO 2004/002235 is successful in producing fabricated leaf tea products with excellent infusion performance and appearance. However we have found that the method of WO 2004/002235 produces leaf teas which have low bulk density, especially if used to manufacture large leaf teas. This can be problematic, especially if the fabricated tea product is packaged for use in tea bags or capsules.

Thus we have sought to provide fabricated leaf tea products which, despite having a large leaf size and a high level of soluble solids, can be efficiently packed in tea bags or capsules.

TESTS AND DEFINITIONS

Tea

"Tea" for the purposes of the present invention means material from *Camellia sinensis* var. *sinensis* and/or *Camellia sinensis* var. *assamica*.

"Leaf tea" for the purposes of this invention means a tea product that contains tea leaves and/or stem in an uninfused form, and that has been dried to a moisture content of less than 30% by weight, and usually has a water content in the range 1 to 10% by weight (i.e. "made tea").

"Fabricated Leaf tea Product" for the purposes of this invention means a tea product comprising leaf tea from a first tea source (a "base leaf tea") and water-soluble solids from a second tea source absorbed into and/or coated onto the leaf tea from the first tea source.

"Green tea" refers to substantially unfermented tea. "Black tea" refers to substantially fermented tea. "Oolong tea" refers to partially fermented tea.

"Fermentation" refers to the oxidative and hydrolytic process that tea undergoes when certain endogenous enzymes and substrates are brought together, e.g., by mechanical disruption of the cells by maceration of the leaves. During this process colourless catechins in the leaves are converted to a complex mixture of yellow and orange to dark-brown polyphenolic substances.

Leaf Size

For the purposes of the present invention, leaf particle size is characterised by sieve mesh size using the following convention:

US mesh sizes (ASTM E11) are used unless otherwise stated.

A "+" before the sieve mesh indicates the particles are retained by the sieve.

A "−" before the sieve mesh indicates the particles pass through the sieve.

For example, if the particle size is described as −8+16 mesh, then the particles will pass through an 8 mesh sieve (particles smaller than 2.36 mm) and be retained by a 16 mesh sieve (particles larger than 1.18 mm).

Bulk Density

For the purposes of the present invention, bulk density of a leaf tea product is determined as follows:

About 50 g of the leaf tea product is accurately weighed to determine its mass (m).

The leaf is then deposited into a glass measuring cylinder having a total volume of 250 ml, an internal diameter of 3.5 cm, and a graduated scale reading to at least the nearest ml.

The measuring cylinder is then shook on a vertical electromagnetic microplate powder shaker (Vibroturbulator™ model 9816, supplied by the Union Scientific Corp. and operating for 30 s at a vibration setting of 60) and the volume (V) of leaf then read from the graduated scale.

The bulk density (D) is then calculated by dividing the mass of the leaf in the cylinder by the settled volume of leaf (i.e. D=m/V).

Total Soluble Solids

"Total soluble solids" (or TSS) of a leaf tea for the purposes of the present invention means water extract as determined by the method set forth in the International Standard ISO 9768: 1994(E) entitled "Tea—Determination of water extract".

Miscellaneous

It should be noted that in specifying any range of values or amount, any particular upper value can be associated with any particular lower value or amount.

For the avoidance of doubt, the word "comprising" is intended to mean "including" but not necessarily "consisting of" or "composed of". In other words, the listed steps or options need not be exhaustive.

The disclosure of the invention as found herein is to be considered to cover all embodiments as found in the claims as being multiply dependent upon each other irrespective of the fact that claims may be found without multiple dependency or redundancy.

It is noted that the examples given in the description below are intended to clarify the invention and are not intended to limit the invention to those examples per se.

All percentages and ratios are by weight unless otherwise indicated.

Except in the operating and comparative examples, or where otherwise explicitly indicated, all numbers in this description indicating amounts of material or conditions of reaction, physical properties of materials and/or use may optionally be understood as modified by the word "about".

SUMMARY OF THE INVENTION

In a first aspect the present invention provides a process for manufacturing a fabricated leaf tea product, comprising the following steps:

(i) providing a concentrated liquid tea composition;

(ii) providing a base leaf tea;

(iii) combining the concentrated liquid tea composition with the base leaf tea to form a tea mixture having a total soluble solids content of at least 50% by dry weight of the mixture; and (iv) drying the tea mixture;

wherein:

at least 20% by weight of the base leaf tea has a particle size of +16 mesh and/or the tea mixture is sorted according to particle size to yield a fraction wherein at least 20% by weight of the fraction has a particle size of +16 mesh; and the time between forming the tea mixture (step iii) and drying (step iv) is at least 5 minutes.

Surprisingly we have found that the fabricated leaf teas produced by the process have a high bulk density despite having a large leaf size and a high content of soluble solids. Without wishing to be bound by theory, we believe that allowing liquid tea composition to contact the base leaf tea for at least 5 minutes prior to drying allows the base leaf to absorb at least some of the tea solids in the liquid tea composition into the body of the tea leaves. Thus the resulting fabricated leaf tea has a more "closed" and "dense" structure than would be obtained by agglomerating a mixture of leaf tea and tea powder.

Thus in a second aspect the invention provides a fabricated leaf tea product wherein:

a) at least 20% by weight of the product has a particle size above 16 mesh (1.18 mm);

b) the bulk density of the leaf tea product is at least 0.35 g $ml^{-1}$; and c) the leaf tea product has a total soluble solids content of at least 50% by weight.

The fabricated leaf tea product of the second aspect is advantageously obtained and/or obtainable by the process of the first aspect.

DETAILED DESCRIPTION

Concentrated Liquid Tea Composition

Step (i) of the process of the invention comprises providing a concentrated liquid tea composition.

By "concentrated" is meant that the liquid tea composition comprises at least 2 wt % tea solids although typically the amount of tea solids in the concentrated liquid composition will be much higher than 2%. This is because the more concentrated the liquid tea composition, the easier it is to deliver a high amount of tea solids to the tea mixture without simultaneously delivering large amounts of water. Large amounts of water in the mixture may make it difficult to absorb substantially all the liquid tea composition into the base leaf tea and/or make it difficult to dry the mixture. Therefore it is preferred that the concentrated liquid tea composition comprises at least 10 wt % tea solids, more preferably at least 15%, more preferably still at least 20%.

If the liquid tea composition is too concentrated then it becomes difficult to combine evenly with the base leaf tea such that certain portions of the base leaf tea may not come into contact with the liquid tea composition (i.e. there may not be sufficient liquid to contact the whole of the base leaf tea in the tea mixture). Therefore it is preferred that the concentrated liquid tea composition comprises at most 40 wt % tea solids, more preferably less than 30%, more preferably still less than 28%, most preferably less than 27%.

The balance of the liquid tea composition other than tea solids will typically be water.

The concentrated liquid tea composition may be provided in a number of ways. For example the composition may be provided by dissolving tea powder in water or it may be provided by removing solvent (water) from a direct aqueous extract of leaf tea.

In a preferred embodiment the concentrated liquid tea composition is a black tea composition.

Base Leaf Tea

Step (ii) of the process of the invention comprises providing a base leaf tea.

The term "base" means that the leaf tea is used as a starting material for manufacture of the fabricated leaf tea product.

It has been found necessary to use leaf tea as a base rather than fresh tea leaves or dhool, because the low moisture content of made tea means that it more readily absorbs the liquid tea composition. It is most preferred that the base leaf tea comprises less than 5 wt % moisture.

In order to maximise the efficiency of the process in terms of the final yield of large leaf sizes in the fabricated leaf tea product, it is advantageous to use a base leaf tea which itself already has a large leaf size. Thus it is preferred that at least 20% by weight of the base leaf tea has a particle size of +16 mesh, more preferably at least 40% and even more preferably at least 50% by weight of the base leaf tea has a particle size of +16 mesh. Most preferably from 75 to 100% by weight of the base leaf tea has a particle size of +16 mesh.

Preferably the base leaf tea does not comprise significant amounts over "oversize" leaf fragments as these may result in a fabricated leaf tea product which is difficult to pack in tea bags or the like. Therefore it is preferred that at least 60% by weight of the base leaf tea has a particle size of −8 mesh, more preferably at least 75% by weight of the base leaf tea has a particle size of −8 mesh, most preferably from 90 to 100% by weight of the base leaf tea has a particle size of −8 mesh.

In a preferred embodiment the base leaf tea is a black leaf tea.

Forming the Tea Mixture

Step (iii) of the process of the invention comprises combining the concentrated liquid tea composition with the base leaf tea to form a tea mixture having a total soluble solids content of at least 50% by dry weight of the mixture.

The level of total soluble solids in the tea mixture can be calculated by summation of the TSS in the base leaf tea with the tea solids in the liquid tea composition. For example, if the base leaf tea has a TSS content of 45 wt % and it is combined in a weight ratio of 1:1 with a liquid tea composition having 25% solids then the TSS of the mixture will be 56 wt %.

To provide enhanced infusion performance desired of the fabricated leaf tea product, the concentrated liquid tea composition and the base leaf tea are combined to form a tea mixture having a total soluble solids content of at least 50% by dry weight. Even better infusion performance can be achieved if the mixture is formed with a total soluble solids content of at least 52% by dry weight of the mixture, more preferably at least 55% and most preferably at least 57%. Too high a level of soluble solids may, however, change characteristics (e.g. appearance) of the fabricated tea such that it no longer resembles leaf tea. Thus it is preferred that the concentrated liquid tea composition and the base leaf tea are combined to form a tea mixture having a total soluble solids content of less than 75% by dry weight, more preferably less than 70% and most preferably less than 65%.

The liquid tea composition and the base leaf tea may be combined in any suitable manner. However it is preferred that the mixture is formed in a way that maximises the intimate mixing of all of the base leaf tea with the liquid tea composition. For example, the liquid tea composition may be sprayed on to the base leaf tea and/or the mixture of base leaf tea and liquid tea composition may be agitated to intimately mix them together.

It is preferred that there is sufficient liquid tea composition to easily distribute around all of the base leaf tea when forming the mixture. Thus the concentrated liquid tea composition and the base leaf tea are preferably combined in a weight ratio of at least 0.7 parts of concentrated liquid tea composition to 1 part of base leaf tea, more preferably at least 1.0 parts of concentrated liquid tea composition to 1 part of base leaf and most preferably at least 1.2 parts of concentrated liquid tea composition to 1 part of base leaf tea.

The amount of liquid tea composition is, however, preferably not too high otherwise it becomes difficult for the base leaf tea to absorb the tea composition and/or the mixture is difficult to dry. Thus the concentrated liquid tea composition and the base leaf tea are preferably combined in a weight ratio of less than 3 parts liquid tea composition to 1 part base leaf tea, more preferably less than 2.5 parts liquid tea composition to 1 part base leaf tea and most preferably less than 2.2 parts liquid tea composition to 1 part base leaf tea.

To avoid premature drying of the tea mixture and allow maximum opportunity for absorption of the liquid tea composition by the base leaf tea, it is preferred that the temperature of the mixture is not too high. Thus it is preferred that the concentrated liquid tea composition and the base leaf tea are combined to form a tea mixture having a temperature of less than 60° C., more preferably less than 50° C. and most preferably from 5 to 40° C.

Equilibrating and Drying the Tea Mixture

Step (iv) of the process of the invention comprises drying the tea mixture and the time between forming the tea mixture (step iii) and drying (step iv) is at least 5 minutes.

Drying can be affected in any known manner provided that it results in reducing the moisture content of the fabricated leaf tea product to the levels of a leaf tea. For example, the mixture could be dried by contacting the mixture with a hot surface and/or with a hot gas such as air. The most preferred drying method is fluid bed drying.

Between forming the mixture and drying, the base leaf tea is allowed time to absorb the liquid tea composition. This time (an "equilibration time") between forming the mixture and drying is defined as the time between the instant that the liquid tea composition first contacts the base leaf tea and the time when the mixture is first brought into contact with a material (e.g., a surface and/or a gas) having a temperature of at least 70° C.

The equilibration time is preferably long enough to allow substantially all of the liquid tea composition to be absorbed into the base leaf tea when judged visually. This time is at least 5 minutes but may be at least 10 minutes, more preferably at least 15 minutes and most preferably at least 20 minutes. The equilibration time need not be too long and therefore is preferably less than 3 hours, more preferably less than 2 hours, more preferably still less than 1 hour and most preferably less than 45 minutes.

To avoid premature drying of the tea mixture and allow maximum opportunity for absorption of the tea composition by the base leaf tea, it is preferred that the temperature of the mixture is not too high during the equilibration step. Thus it is preferred that during the equilibration time the tea mixture has a temperature not exceeding 60° C., more preferably less than 50° C. and most preferably from 5 to 40° C.

Sortation and Packaging

If the base leaf tea was selected to have a large leaf size then the drying step may, in the absence of any further sortation, result in a fabricated leaf tea product having the desired large leaf size. However, even in this case the processing of the tea mixture may have led to some agglomeration and/or particle break up which changes the particle size. Thus additionally or alternatively the tea mixture is preferably sorted according to particle size to yield a fraction wherein at least 20% by weight of the fraction has a particle size of +16 mesh, the fraction forming the fabricated leaf tea product. More preferably at least 40% by weight of the fraction has a particle size of +16 mesh, even more preferably at least 50% and most preferably from 75 to 100% by weight of the fraction has a particle size of +16 mesh. Preferably also at least 60% by weight of the fraction has a particle size of −8 mesh, more preferably at least 75% by weight of the fraction has a particle size of −8 mesh, most preferably from 90 to 100% by weight of the fraction has a particle size of −8 mesh. The mixture is preferably sorted after drying to avoid subsequent changes in particle size due to the drying process.

The fabricated leaf tea product of the present invention has a high bulk density compared with conventional fabricated leaf tea products and so is especially suited for packaging in an infusion package. An infusion package is defined as a closed container which comprises at least one filter wall wherein the filter wall is water-permeable but is not permeable to the leaf tea. Examples of infusion packages are tea bags and capsules. Tea bags are typically formed from flexible filter material such as paper, non-woven fabric, woven fabric and the like. Capsules are typically formed from plastic material and/or plastic-metal foil composites.

The Fabricated Leaf Tea Product

The fabricated leaf tea product of the present invention is a large leaf tea product and so at least 20% by weight of the product has a particle size of +16 mesh. Preferably at least 40% by weight of the product has a particle size of +16 mesh, more preferably at least 50% and most preferably from 75 to 100% by weight of the product has a particle size of +16 mesh. Preferably also at least 60% by weight of the product has a particle size of −8 mesh, more preferably at least 75% by weight of the product has a particle size of −8 mesh, most preferably from 90 to 100% by weight of the product has a particle size of −8 mesh.

The fabricated leaf tea product has a total soluble solids content of at least 50% by weight which affords excellent infusion performance to the product. Even better infusion performance can be achieved if the product has a total soluble solids content of at least 52%, more preferably at least 55% and most preferably at least 57%. Too high a level of soluble solids may, however, change characteristics (e.g. appearance) of the fabricated tea such that it no longer resembles leaf tea. Thus it is preferred that the fabricated leaf tea product has a soluble solids content of less than 75% by dry weight, more preferably less than 70% and most preferably less than 65%.

The bulk density of the leaf tea product is higher than conventional fabricated leaf tea products and is at least 0.35 g ml$^{-1}$. The bulk density of the leaf tea product may be at least 0.37 g ml$^{-1}$, and most preferably is from 0.39 to 0.55 g ml$^{-1}$.

The fabricated leaf tea product is preferably a black leaf tea product.

The fabricated leaf tea product is preferably packaged in an infusion package.

EXAMPLES

The present invention will be further described with reference to the following non-limiting examples.

Example 1

This Example demonstrates manufacture of a fabricated leaf tea product according to the invention.

Production of Base Leaf Tea

Fresh tea leaves were withered to a moisture content of 68 wt %. The withered leaves were then macerated using a combination of a rotorvane and a double-cone processor. The resulting dhool was then fermented for around 2 hours at a temperature of about 25° C. The fermented dhool was then dried in a fluid bed drier to a moisture content of 3.5 wt % to yield black leaf tea.

The black leaf tea was then subjected to fibre removal and sorted into the following fractions:

| Fraction | OS | LL | ML | SL | FL | D1 | Sec. |
|---|---|---|---|---|---|---|---|
| Mesh (ASTM) | +8 | +14 | +24 | +32 | +40 | −40 | Fibres |
| wt % | 10 | 40 | 10 | 10 | 8 | 2 | 20 |

The LL fraction (−8+14 mesh) was selected as the base leaf tea for use in the further steps of manufacturing the fabricated leaf tea product.

Production of Concentrated Liquid Tea Composition

One part by weight of commercial black CTC leaf tea was extracted in 6 parts by weight of 85° C. deionised water for 10 minutes. The extract and leaf residue were then separated by filtering through muslin. The leaf residue was squeezed as dry as possible by hand in the muslin. This process resulted in a first liquid extract and a cake of leaf residue. The damp cake was then further extracted in 4 parts by weight of 85° C. deionised water for 10 minutes. This second extract was filtered in the same way as the first extract. The first and second extracts were then combined to give around 8 parts by weight of the combined extract.

The combined extract was freeze-dried to a powder. The powder was then dissolved in hot water to produce a concentrated liquid composition containing 25 wt % tea solids. The concentrated liquid composition was allowed to cool to room temperature (around 25° C.) before being combined with the base leaf tea.

Combining the Leaf Tea and Liquid Composition

The base leaf tea and the concentrated liquid composition were mixed at a weight ratio of 1.5 parts liquid to 1 part leaf tea. The resulting mixture was allowed to equilibrate for 30 minutes at room temperature with occasional stirring by hand. After this equilibration period, visual inspection showed that all of the liquid composition had been absorbed by the leaf tea.

Drying the Mixture

After the equilibration period the mixture was dried in a fluid bed drier to a moisture content of around 5 wt %. Although the base leaf tea was the LL fraction and so was 100% by weight of particles having a size of −8+14 mesh, the mixing and drying processes resulted in a change to the particle size. The resulting fabricated leaf tea product had the following grade profile:

| Mesh (ASTM) | +8 | +16 | +25 | +40 | −40 |
|---|---|---|---|---|---|
| wt % | 12.6 | 54.0 | 25.0 | 4.6 | 3.8 |

Example 2

This Example compares the properties of a fabricated leaf tea product according to the invention with an existing fabricated leaf tea product and with commercially available large-leaf teas.

Samples

Sample A was the fabricated leaf tea product of Example 1.

Sample B was the base leaf tea from which the fabricated leaf tea product of Example 1 was manufactured.

Sample C was a fabricated leaf tea product made according to the process of WO 2004/002235.

Sample D was commercially available large leaf Assam black tea.

The samples were each sieved to recover a fraction with particle size of −8+16 mesh and tests were performed on this fraction.

Results

The table below summarises the properties of the samples:

| Sample | A | B | C | D |
|---|---|---|---|---|
| Bulk Density (g ml$^{-1}$) | 0.467 | 0.278 | 0.340 | 0.423 |
| Total Soluble Solids (wt %) ISO 9768 | 61 | 46 | 59 | 46 |

The infusion performance of each leaf tea was determined by infusing 3 g of the leaf tea in 200 ml water at 85° C. for 30 s and measuring the amount of tea solids in the resulting infusions. The results were as follows:

| Sample | A | B | C | D |
|---|---|---|---|---|
| Solids delivered to infusion (g per 200 ml) | 0.90 | 0.39 | 1.1 | 0.46 |

Thus the fabricated leaf tea product according to the invention (Sample A) has similar infusion performance to existing fabricated leaf tea products (sample C) but has a bulk density more like that of commercial large leaf tea (sample D) which is sold in tea bags.

The invention claimed is:

1. A fabricated leaf tea product wherein:
   a) at least 20% by weight of the product has a particle size of +16 mesh;
   b) the bulk density of the leaf tea product is at least 0.35 g ml$^{-1}$; and
   c) the leaf tea product has a total soluble solids content of at least 50% by weight.

2. The fabricated leaf tea product as claimed in claim 1 wherein at least 40% by weight of the fabricated leaf tea product has a particle size of +16 mesh.

3. The fabricated leaf tea product as claimed in claim 1 wherein the bulk density of the leaf tea product is at least 0.37 g ml$^{-1}$.

4. The fabricated leaf tea product as claimed in claim 1 wherein the leaf tea product has a total soluble solids content of at least 52% by weight.

5. The fabricated leaf tea product as claimed in claim 1 which is a fabricated black leaf tea product.

6. The fabricated leaf tea product as claimed in claim 1 which is packaged in an infusion package.

7. The fabricated leaf tea product as claimed in claim 1 wherein about 50% to 100% by weight of the fabricated leaf tea product has a particle size of +16 mesh.

8. The fabricated leaf tea product as claimed in claim 1 wherein the bulk density of the leaf tea product is about 0.39 to 0.55 g ml$^{-1}$.

9. The fabricated leaf tea product as claimed in claim 1 wherein the leaf ea product has a total soluble solids content of about 55 to 75% by weight.

* * * * *